(12) United States Patent
De Benedictis et al.

(10) Patent No.: US 7,798,228 B2
(45) Date of Patent: Sep. 21, 2010

(54) LIQUID BREAKER FOR ACID FRACTURING FLUIDS

(75) Inventors: Frances De Benedictis, Spring, TX (US); Xiaolan Wang, Spring, TX (US); Qi Qu, Spring, TX (US)

(73) Assignee: BJ Services Company LLC, Houston, TX (US)

( * ) Notice: Subject to any disclaimer, the term of this patent is extended or adjusted under 35 U.S.C. 154(b) by 0 days.

(21) Appl. No.: 12/179,618

(22) Filed: Jul. 25, 2008

(65) Prior Publication Data

US 2010/0018705 A1 Jan. 28, 2010

(51) Int. Cl.
*E21B 43/16* (2006.01)
*E21B 43/26* (2006.01)

(52) U.S. Cl. .................. 166/308.5; 166/305.1; 166/300

(58) Field of Classification Search ........................ None
See application file for complete search history.

(56) References Cited

U.S. PATENT DOCUMENTS

| | | | | |
|---|---|---|---|---|
| 4,504,400 A | * | 3/1985 | Willard | 507/216 |
| 4,770,796 A | * | 9/1988 | Jacobs | 507/260 |
| 4,809,783 A | * | 3/1989 | Hollenbeck et al. | 166/307 |
| 5,497,830 A | * | 3/1996 | Boles et al. | 166/300 |
| 5,975,206 A | | 11/1999 | Woo et al. | |
| 6,046,140 A | | 4/2000 | Woo et al. | |
| 6,767,868 B2 | | 7/2004 | Dawson et al. | |
| 2007/0235189 A1 | * | 10/2007 | Milne et al. | 166/280.1 |
| 2008/0135242 A1 | * | 6/2008 | Lesko et al. | 166/268 |

OTHER PUBLICATIONS

MSDS Fluoboric Acid, MSDS No. F2608, Effective date Jul. 16, 2007, retrieved Sep. 22, 2009 from http://www.jtbaker.com/msds/englishhtml/f2608.htm.*

* cited by examiner

*Primary Examiner*—Zakiya W Bates
*Assistant Examiner*—Angela M DiTrani
(74) *Attorney, Agent, or Firm*—Howrey LLP

(57) ABSTRACT

Liquid breakers can be used in methods and compositions for acid fracturing formations. The fracturing fluid includes a liquid breaker that decreases the viscosity of the fracturing fluid over time. The liquid breaker can also be produced in situ. The liquid breaker includes fluoroboric acid.

14 Claims, No Drawings

LIQUID BREAKER FOR ACID FRACTURING FLUIDS

BACKGROUND OF THE INVENTION

1. Field of the Invention

The invention relates to acid fracturing fluids used to fracture subterranean formations. Specifically, the invention relates to methods for breaking an acid fracturing fluid through the use of a liquid breaker incorporated in the acid fracturing fluid.

2. Description of the Related Art

Subterranean formations of oil and gas wells are often treated by fracturing the formations to increase the production of oil or gas. Acid fracturing is a type of well stimulation treatment performed in carbonate formations in which acid is forced into the formation at a pressure above the formation-fracturing pressure to cause the formation to crack open. The acid reacts with the fracture faces in a non-uniform pattern, which is referred to as etching, to form conductive channels that remain open without a propping agent after the fracture closes.

Acid fracturing generally requires the fluid to reach maximum viscosity as in enters the fracture, which affects the length and width of the fracture. Many types of acid systems can be used for acid fracturing, but crosslinked acid is one of the most commonly used systems. In the crosslinked acid system, a polymer is hydrated and gelled in an acid, then crosslinked through crosslinking using metal crosslinking agents to increase its viscosity. The viscosity of the acid fracturing fluid correlates to the created fracture geometry and fracture width. Normally, the more viscous fluids will produce longer and wider fractures. Crosslinked acid systems have advantages over other prior art acid fracturing treatments, such as deeper penetration into the formation, and superior acid leakoff control.

Once the acid fracturing treatment is complete, the acid fracturing fluid is recovered by reducing the viscosity of the fluid by means of "gel breakers." Gel breakers break down the gelled fluid so that it can be easily pumped and removed from the well. The recovery of the acid fracturing fluid is accomplished by reducing the viscosity of the fluid to a low enough viscosity so that it flows naturally from the formation.

Various methods have been proposed to control the break mechanism of the prior art breaker systems. Most prior art methods of breaking acid fracturing fluids include the use of solids, such as prills, pellets, beads, capsules, granules, encapsulated materials, and the like. Often times these types of breakers are difficult to handle and do not disperse well. Due to operational limitations, breakers in solid form may not be applicable in field applications. Breakers in solid form may also be unable to break the polymer gels penetrating deep into the formation.

Besides issues related to handling of breakers, the timing of the breaking of the fracturing fluid is important. Solid breakers often do not produce consistent breaking times for the acid fracturing fluids. Breaking too soon or too late causes problems with the fracture. Gels that break prematurely can cause a premature reduction in the fluid viscosity resulting in a less than desirable fracture width in the fracture being created. On the other hand, crosslinked fluids that break too slowly can cause slow recovery of the fracturing fluid from the produced fracture with attendant delay in resuming the production of formation fluids.

A need exists for a breaker that is effective and relatively easy to handle. It would be advantageous if the breaker is efficient at reducing viscosity of acid fracturing fluids in a controlled manner. It would be also desirable to have a "live" breaker that can break the polymer gels penetrating deep into the formation.

SUMMARY OF THE INVENTION

In view of the foregoing, methods and compositions for acid fracturing of formations are provided as embodiments of the present invention. The methods and compositions of the present invention reduce the viscosity of the acid fracturing fluid to allow for recovery of the acid fracturing fluid upon completion of the acid fracturing treatment. In an aspect, the breaker is a liquid. In another aspect, the formations are carbonate formations.

In an embodiment, a method of acid fracturing a zone of a subterranean formation penetrated by a well bore is provided. In this embodiment, a polymer comprising acrylamide, an acid, and a breaker comprising fluoroboric acid are combined to form a gelled acid. Once the gelled acid is formed, a zirconium-based crosslinking agent is added to the gelled acid for crosslinking the polymer comprising acrylamide to form a crosslinked fluid of sufficient viscosity to facilitate fracturing of the formation. Once the crosslinked fluid is produced, it is injected into the well bore and into contact with the formation under sufficient pressure to cause the formation to crack open. The acid then etches the fracture surfaces in a non-uniform pattern to form conductive channels that remain open without proppant after the fracture closes. In the meantime, the fluoroboric acid decomposes to generate fluoride ions that break the crosslinker-polymer bonding in the crosslinked fluid upon completion of the acid fracturing treatment. The viscosity of the crosslinked fluid decreases as the crosslinker-polymer bonds are broken.

As another embodiment, another method of fracturing a zone of a subterranean formation penetrated by a well bore is provided. In this embodiment, a polymer comprising acrylamide, an acid, and a breaker comprising hydrochloric acid, ammonium bifluoride, and boric acid are combined to form a gelled acid. Once the gelled acid is formed, a zirconium-based crosslinking agent is added to the gelled acid for crosslinking the polymer comprising acrylamide to form a crosslinked fluid of sufficient viscosity to facilitate fracturing of the formation. Once the crosslinked fluid is produced, it is injected into the well bore and into contact with the formation under sufficient pressure to cause the formation to crack open. The acid then etches the fracture surfaces in a non-uniform pattern to form conductive channels that remain open without proppant after the fracture closes. In the meantime, the hydrochloric acid, ammonium bifluoride, and boric acid react in the formation and produce fluoroboric acid in situ during the acid fracturing treatment. Thereafter, the fluoroboric acid decomposes to generate fluoride ions that break the crosslinker-polymer bonding in the crosslinked fluid upon completion of the acid fracturing treatment. The viscosity of the crosslinked fluid decreases as the crosslinker-polymer bonds are broken.

Besides the method embodiments, compositions are also provided as embodiments of the present invention. In an embodiment, an acid fracturing fluid is provided. The acid fracturing fluid comprises a polymer comprising acrylamide; a breaker; an acid; and a zirconium-based crosslinking agent.

The breaker comprises fluoroboric acid; hydrochloric acid, ammonium bifluoride, and boric acid; or combinations thereof.

DESCRIPTION OF ILLUSTRATIVE EMBODIMENTS

Illustrative embodiments of the invention are described below as they might be employed in the operation and in the treatment of well bores. In the interest of clarity, not all features of an actual implementation are described in this specification. It will, of course, be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

In general, the present invention relates to methods of reducing the viscosity of acid fracturing fluids by breaking the crosslinked polymeric gel. The present invention also provides a liquid breaker for reducing the acid fracturing fluid viscosity by breaking the crosslinked polymeric gel.

In an embodiment, a method of fracturing a zone of a subterranean formation penetrated by a well bore is provided. In this embodiment, a polymer comprising acrylamide, an acid, and a breaker comprising fluoroboric acid are combined to form a gelled acid. Once the gelled acid is formed, a zirconium-based crosslinking agent is then added to the gelled acid for crosslinking the polymer comprising acrylamide to form a crosslinked fluid of sufficient viscosity to facilitate fracturing of the formation. Once the crosslinked fluid is produced, it is injected into the well bore and into contact with the formation under sufficient pressure to cause the formation to crack open. The acid then etches the fracture surfaces in a non-uniform pattern to form conductive channels that remain open without proppant after the fracture closes. In the meantime, the fluoroboric acid decomposes to generate fluoride ions that break the crosslinker-polymer bonding in the crosslinked fluid upon completion of the acid fracturing treatment. The viscosity of the crosslinked fluid decreases as the crosslinker-polymer bonds are broken.

In embodiments of the present invention, the polymer comprises acrylamide. As used herein, the term "acrylamide" can include acrylamide, (meth)acrylamide, diacetone acrylamide, N-methylolacrylamide, and combinations thereof. In an embodiment, the polymer is a polyacrylamide or derivative thereof, a copolymer of acrylamide or (meth)acrylamide, or a hydrophobically-modified polyacrylic acid/acrylate copolymer. Suitable comonomers include N-vinylformamide, N-vinylacetamide, N-vinylcaprolactam, N-vinylimidazole, N-vinylpyridine, 2-acrylamido-2-methylpropanesulfonic acid (AMPS), N-vinylpyrolidone, acrylamidopropyltrimonium chloride, or combinations thereof. Typically, the copolymers are comprised of two distinct monomers in a 10:90 to 90:10 weight percent ratio of acrylamide to other comonomers.

Other suitable polymers are polyacrylic acids, salts, and copolymers thereof. Such polymers can be produced from at least one monomer selected from the group consisting of acrylic acid, (meth)acrylic acid, alkyl acrylate, and alkyl (meth)acrylate such as methyl acrylate, ethyl acrylate, propyl acrylate, butyl acrylate, octyl acrylate, dodecyl acrylate, (meth)acrylic acid, methyl (meth)acrylate, ethyl (meth)acrylate, propyl (meth)acrylate, isopropyl (meth)acrylate, butyl (meth)acrylate, or combinations thereof. Further, the polymers can be acrylate copolymers containing acrylamide or acrylonitrile. Other suitable polymers will be apparent to those of skill in the art and are to be considered within the scope of the present invention.

In an embodiment, the copolymer contains about 20 weight percent-about 50 weight percent of 2-acrylamido-2-methylpropanesulfonic acid, about 2 weight percent-about 5 weight percent of acrylamide, and about 45 weight percent-about 78 weight percent acrylamide and has been crosslinked with about 0.5 weight percent of a crosslinking agent of trimethylolpropane diallylether or polyethyleneglycol diallylether. Other suitable amounts of copolymer will be apparent to those of skill in the art and are to be considered within the scope of the present invention.

In an aspect, the fluoroboric acid is added to an acid treatment fluid before hydrating the acid treatment fluid and crosslinking the polymer. In an aspect, the fluoroboric acid can be added in a range of about 10 ppm-150 ppm of the acid fracturing fluid. The fluoroboric acid is inert and does not affect the hydration and crosslinking of the polymer comprising acrylamide in the acid. The fluoroboric acid can be added to the acid fracturing fluid or it can be produced in situ by supplying hydrochloric acid, ammonium bifluoride, and boric acid and reacting the components in the formation so that the fluoroboric acid is produced in situ. After pumping the crosslinked gelled acid to the formation, either temperature or increasing pH due to the acid reacting with the formation would trigger the decomposition of hydrofluoric acid to release the fluoride ions upon completion of the acid fracturing treatment. The fluoride ions then will take away the metal ion (zirconium) in the crosslinking agent by breaking the zirconium-polymer bonding from the crosslinked polymer.

The delay time of the liquid breaker can be adjusted by adjusting the amount of the components that are supplied in the acid fracturing fluid. For example, when hydrochloric acid, ammonium bifluoride, and boric acid are used as the liquid breaker, the time in which it takes for the breaker to break the acid fracturing fluid can be adjusted by adjusting the amount of boric acid that is present, i.e., the more boric acid that is present, the slower the liquid breaker breaks down the acid fracturing fluid. Other suitable adjustments to the ratios of the components that will affect the conditions in which the acid fracturing fluid breaks down will be apparent to those of skill and are to be considered within the scope of the present invention.

The liquid breaker of the present invention can be used with various types of acids that are used in acid fracturing fluids. In embodiments of the present invention, the acid comprises hydrochloric acid, formic acid, acetic acid, citric acid, or combinations thereof. Other suitable acids useful in acid fracturing treatments will be apparent to those of skill in the art and are to be considered within the scope of the present invention.

Besides being able to use various types of acids in the methods and compositions of the present invention, various types of crosslinking agents can be used. In an aspect, the crosslinking agent can comprise any suitable crosslinker known in the art. In an embodiment, for example, the crosslinking agent comprises a zirconium based crosslinker, including but not limited to zirconium lactate, zirconium acetate, zirconium lactate with alkanolamine, and combinations thereof. Other suitable crosslinking agents useful in the present invention will be apparent to those of skill in the art and are to be considered within the scope of the present invention.

Besides the acid, crosslinking agents, and breakers described herein, various additives can be useful in the present invention. Additives used in the oil and gas industry and known in the art, including but not limited to, corrosion inhibitors, non-emulsifiers, iron control agents, delay additives, silt suspenders, flowback additives, and gel breakers, can also be used in embodiments of the present invention. Proppants including, but not limited to, 100 mesh sand, 20/40 mesh frac sand, and resin coated sand can also be used. Other suitable additives useful in the present invention will be apparent to those of skill in the art and are to be considered within the scope of the present invention.

In addition to being able to vary the types of components that can be used in the present invention, the amounts of the components of the acid fracturing fluid can be varied. For example, the amount of the zirconium-based crosslinking agent and the amount of acid in the fracturing fluid can be varied. In an aspect, the crosslinking agent is present in a range of about 4 gallons to about 20 gallons per 1000 gallons of the gelled fluid. In an is aspect, the acid present in a range of about 3 wt. % to about 28 wt. %. For example, when the acid is hydrochloric acid, the acid can be 28 wt. % HCl. Other suitable amounts of the zirconium-based crosslinking agent and the acid will be apparent to those of skill in the art and are to be considered within the scope of the present invention.

Besides adjusting the amount of the liquid breaker components that are present, other operational adjustments, such as increasing the temperature, can be made that affect the time that it takes to break the acid fracturing fluids. Suitable adjustments will be apparent to those of skill in the art and are to be considered within the scope of the present invention.

The timing in which the breakers perform its function is important. Optimally, the acid fracturing fluid will begin to break when the pumping operations are concluded. For practical purposes, the acid fracturing fluid should be completely broken within about 24 hours after completion of the fracturing treatment.

The liquid breaker of the present invention breaks down the acid fracturing fluid by decreasing the viscosity of the acid fracturing fluid. The decrease in the viscosity of the acid fracturing fluids allows for easier recovery of the acid fracturing fluid once the acid fracturing treatment is complete. In an aspect, a viscosity of the gelled fluid is less than a viscosity of a gelled fluid without the fluoroboric acid. In another aspect, a viscosity of the gelled fluid decreases over time.

As another embodiment, another method of fracturing a zone of a subterranean formation penetrated by a well bore is provided. In this embodiment, a polymer comprising acrylamide, an acid, and a breaker comprising hydrochloric acid, ammonium bifluoride, and boric acid are combined to form a gelled acid. Once the gelled acid is formed, a zirconium-based crosslinking agent is added to the gelled acid for crosslinking the polymer comprising acrylamide to form a crosslinked fluid of sufficient viscosity to facilitate fracturing of the formation. Once the crosslinked fluid is produced, it is injected into the well bore and into contact with the formation under sufficient pressure to cause the formation to crack open. The acid then etches the fracture surfaces in a non-uniform pattern to form conductive channels that remain open without proppant after the fracture closes. Once the gelled fluid is produced, it is injected into the well bore and into contact with the formation under sufficient pressure to react the acid and the formation at conditions. In the meantime the hydrochloric acid, ammonium bifluoride, and boric acid react and produce fluoroboric acid. The fluoroboric acid is formed in situ in the formation. In the formation, typically after the acid fracturing treatment is complete, the conditions are so that the fluoroboric acid decomposes to generate fluoride ions that break the crosslinker-polymer bonding in the crosslinked fluid to allow for easier recovery of the acid fracturing fluid.

As indicated previously, in an aspect, the liquid breaker can be prepared by mixing hydrochloric acid, ammonium bifluoride, and boric acid together to produce fluoroboric acid, instead of supplying fluoroboric acid directly into the composition. By using the three components separately, the breaking properties can be customized as needed. For example, by changing the ratio of these three chemicals, different delay times can be achieved. The breaking properties can also be customized when using previously prepared fluoroboric acid. Other suitable variations will be apparent to those of skill in the art and are to be considered within the scope of the present invention.

Besides the method embodiments, compositions are also provided as embodiments of the present invention. In an embodiment, an acid fracturing fluid is provided. The acid fracturing fluid comprises a polymer comprising acrylamide; a breaker comprising fluoroboric acid; hydrochloric acid, ammonium bifluoride, and boric acid; or combinations thereof; an acid; and a zirconium-based crosslinking agent.

As with other embodiments, the fluoroboric acid is present in a range of about 10 ppm to about 150 ppm of the fracturing fluid. In an aspect, the crosslinking agent is present in a range of about 4 gallons to about 20 gallons per 1000 gallons of the gelled fluid. In an aspect, the acid has an acidic strength in a range of about 3 wt. % to about 28 wt. %. Other suitable amounts of fluoroboric acid, crosslinking agent, and acid will be apparent to those of skill in the art and are to be considered within the scope of the present invention.

The liquid breaker of the present invention is effective at reducing the viscosity of the acid fracturing fluid. The liquid breaker releases fluoride ions that break zirconium-polymer bonding in the acid fracturing fluid, which reduces the viscosity of the acid fracturing fluid. In an aspect, a viscosity of the fracturing fluid decreases over time.

The liquid breaker is compatible with existing acid fracturing systems and does not require any special additives or equipment. For example, additives that are typically used in acid fracturing treatments can be used in the present invention, as will be apparent to those of skill in the art and are to be considered within the scope of the present invention.

As an advantage, the breakers in accordance with embodiments of the present invention are efficient, effective, and much easier to handle than prior art solid breakers. The breakers of the present invention disperse very well within the acid treatment fluids, which enables users to control how the treatment fluid is broken down.

EXAMPLES

The following examples are included to demonstrate the use of compositions in accordance with embodiments of the present invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the scope of the invention.

Example 1

Commercially available fluoroboric acid having a concentration of 48 wt. % was diluted to 1 part:30 parts by volume in deionized water. DEEPSPOT™ acid (which is a crosslinked 15 wt. % hydrochloric acid) was prepared using 1.33 gallons per thousand of the fluoroboric acid-water solution as an additive. The sample was placed in a 180 degree F. water bath. Rheology readings were taken at 1.5 hours on a Fann 35 rheometer with a R1B1 configuration. The sample, which is labeled as Sample No. 3 was compared with the control Sample No. 1, which was DEEPSPOT™ acid without any breaker, and Sample No. 2, which was DEEPSPOT™ acid using a solid DEEPSPOT™ breaker commercially available as GBA-2. As shown in Table 1, the breaker made in accordance with an embodiment of the present invention had the lowest viscosity at the end of the 1.5 hour bath.

TABLE 1

| Sample No. | System | Viscosity (cP) |
|---|---|---|
| 1 | DEEPSPOT ™ Control | 53 |
| 2 | GBA-2 | 20 |
| 3 | $HBF_4$ | 11 |

Commercially available fluoroboric acid having a concentration of 48 wt. % was diluted to 1 part:300 parts by volume in deionized water. DEEPSPOT™ acid (15 wt. % hydrochloric acid) was prepared using 1.33 gallons per thousand of the fluoroboric acid-water solution as an additive. The sample was placed in a 180 degrees F. water bath. Rheology readings were taken at 1, 2, and 3 hours on a Fann 35 rheometer using a R1B1 configuration. As shown in Table 2, by using the breaker of the present invention, users are able to control the rate of delay.

TABLE 2

| Time (hr) | Viscosity (cP) |
|---|---|
| 1 | 48 |
| 2 | 30 |
| 3 | 13 |

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the methods described herein without departing from the concept, spirit and scope of the invention. More specifically, it will be apparent that certain agents that are chemically related can be substituted for the agents described herein while the same or similar results would be achieved. All such similar substitutes and modifications apparent to those skilled in the art are deemed to be within the scope and concept of the invention.

What is claimed is:

1. A method of fracturing a zone of a subterranean carbonate formation penetrated by a well bore, comprising the steps of:

a) hydrating a polymer comprising acrylamide, an acid, and a liquid breaker comprising fluoroboric acid to produce a gelled acid;

b) adding a zirconium based crosslinking agent to crosslink the gelled acid to produce a crosslinked fluid of sufficient viscosity to facilitate fracturing of the formation; and c) injecting the crosslinked fluid into the well bore and into contact with the formation under sufficient pressure to react the acid and the formation at conditions that decompose the fluoroboric acid to form fluoride ions that break zirconium—polymer bonding in the crosslinked fluid.

2. The method of claim 1, wherein the fluoroboric acid is present in a range of about 10 ppm to about 150 ppm of the crosslinked fluid.

3. The method of claim 1, wherein the acid comprises hydrochloric acid, formic acid, acetic acid, citric acid, or combinations thereof; the acrylamide comprises acrylamide, (meth)acrylamide, diacetone acrylamide, N-methylolacrylamide, a polyacrylamide derivative, a copolymer of acrylamide, a copolymer of (meth)acrylamide, a hydrophobically-modified polyacrylic acid/acrylate copolymer, or combinations thereof; and the crosslinking agent comprises zirconium lactate, zirconium acetate, zirconium lactate with alkanolamine, and combinations thereof.

4. The method of claim 1, wherein the crosslinking agent is present in a range of about 4 gallons to about 20 gallons per 1000 gallons of the crosslinked fluid.

5. The method of claim 1, wherein the acid is present in a range of about 3 wt. % to about 28 wt. %.

6. The method of claim 1, wherein a viscosity of the crosslinked fluid is less than a viscosity of a same crosslinked fluid without the fluoroboric acid.

7. The method of claim 1, wherein a viscosity of the crosslinked fluid decreases over time.

8. A method of fracturing a zone of a subterranean carbonate formation penetrated by a well bore, comprising the steps of:

a) combining a polymer comprising acrylamide, an acid, and a liquid breaker comprising hydrochloric acid, ammonium bifluoride, and boric acid to produce a gelled acid;

b) adding a zirconium-based crosslinking agent to crosslink the gelled acid to form a crosslinked fluid of sufficient viscosity to facilitate fracturing of the formation; and c) injecting the crosslinked fluid into the well bore and into contact with the formation under sufficient pressure to react the acid and the formation at conditions, the hydrochloric acid, ammonium bifluoride, and boric acid react and produce fluoroboric acid, the conditions being so that the fluoroboric acid decomposes to form a fluoride ion that breaks zirconium—polymer bonding in the crosslinked fluid.

9. The method of claim 8, wherein the fluoroboric acid is produced in situ in a range of about 10 ppm to about 150 ppm of the crosslinked fluid.

10. The method of claim 8, wherein the acid comprises hydrochloric acid, formic acid, acetic acid, citric acid, or combinations thereof; the acrylamide comprises acrylamide, (meth)acrylamide, diacetone acrylamide, N-methylolacrylamide, a polyacrylamide derivative, a copolymer of acrylamide, a copolymer of (meth)acrylamide, a hydrophobically-modified polyacrylic acid/acrylate copolymer, or combinations thereof; and the crosslinking agent comprises zirconium lactate, zirconium acetate, zirconium lactate with alkanolamine, and combinations thereof.

11. The method of claim 8, wherein the crosslinking agent is present in a range of about 4 gallons to about 20 gallons per 1000 gallons of the crosslinked fluid.

12. The method of claim 8, wherein the acid is present in a range of about 3 wt. % to about 28 wt. %.

13. The method of claim 8, wherein a viscosity of the crosslinked fluid is less than a viscosity of a same crosslinked fluid without the fluoroboric acid.

14. The method of claim 8, wherein a viscosity of the crosslinked fluid decreases over time.

* * * * *